|| US010579537B2

United States Patent
Hale et al.

(10) Patent No.: US 10,579,537 B2
(45) Date of Patent: *Mar. 3, 2020

(54) MEMORY HAVING A STATIC CACHE AND A DYNAMIC CACHE

(71) Applicant: Micron Technology, Inc., Boise, ID (US)

(72) Inventors: Christopher S. Hale, Boise, ID (US); Sampath K. Ratnam, Boise, ID (US); Kishore K. Muchherla, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,382

(22) Filed: May 2, 2019

(65) Prior Publication Data

US 2019/0258584 A1    Aug. 22, 2019

Related U.S. Application Data

(63) Continuation of application No. 16/118,901, filed on Aug. 31, 2018, now Pat. No. 10,303,614, which is a continuation of application No. 15/841,601, filed on Dec. 14, 2017, now Pat. No. 10,083,119, which is a continuation of application No. 15/607,715, filed on May 30, 2017, now Pat. No. 9,864,697, which is a continuation of application No. 14/735,498, filed on Jun. 10, 2015, now Pat. No. 9,697,134.

(51) Int. Cl.
*G06F 12/00* (2006.01)
*G06F 12/0897* (2016.01)
*G06F 3/06* (2006.01)
*G06F 12/02* (2006.01)
*G06F 12/0804* (2016.01)
*G06F 12/0871* (2016.01)

(52) U.S. Cl.
CPC ........ *G06F 12/0897* (2013.01); *G06F 3/0604* (2013.01); *G06F 3/0634* (2013.01); *G06F 3/0673* (2013.01); *G06F 12/0238* (2013.01); *G06F 12/0804* (2013.01); *G06F 12/0871* (2013.01); *G06F 2212/1008* (2013.01); *G06F 2212/1016* (2013.01); *G06F 2212/1024* (2013.01); *G06F 2212/1036* (2013.01); *G06F 2212/1041* (2013.01); *G06F 2212/2515* (2013.01); *G06F 2212/281* (2013.01); *G06F 2212/608* (2013.01); *G06F 2212/6012* (2013.01); *G06F 2212/7203* (2013.01); *G06F 2212/7206* (2013.01)

(58) Field of Classification Search
None
See application file for complete search history.

(56) References Cited

U.S. PATENT DOCUMENTS 9,092,340 B2   7/2015  Sprouse et al.
2009/0327590 A1  12/2009  Moshayedi et al.
(Continued)

*Primary Examiner* — John A Lane
(74) *Attorney, Agent, or Firm* — Brooks, Cameron & Huebsch, PLLC

(57) ABSTRACT

The present disclosure includes memory having a static cache and a dynamic cache. A number of embodiments include a memory, wherein the memory includes a first portion configured to operate as a static single level cell (SLC) cache and a second portion configured to operate as a dynamic SLC cache when the entire first portion of the memory has data stored therein.

18 Claims, 4 Drawing Sheets

(56) References Cited

U.S. PATENT DOCUMENTS

| | | |
|---|---|---|
| 2012/0059992 A1 | 3/2012 | Radke et al. |
| 2013/0003457 A1 | 1/2013 | Wood et al. |
| 2013/0024601 A1 | 1/2013 | Floman et al. |
| 2013/0254458 A1 | 9/2013 | Pittelko |
| 2015/0092488 A1 | 4/2015 | Wakchaure et al. |
| 2015/0363105 A1 | 12/2015 | Nakao et al. |
| 2016/0098350 A1 | 4/2016 | Tang et al. |

MEMORY HAVING A STATIC CACHE AND A DYNAMIC CACHE

PRIORITY INFORMATION

This application is a Continuation of U.S. application Ser. No. 16/118,901, filed on Aug. 31, 2018, which is a Continuation of U.S. application Ser. No. 15/841,601, filed Dec. 14, 2017, now U.S. Pat. No. 10,083,119, which is a Continuation of U.S. application Ser. No. 15/607,715 filed on May 30, 2017, now U.S. Pat. No. 9,864,697, which is a Continuation of U.S. application Ser. No. 14/735,498, filed on Jun. 10, 2015, now U.S. Pat. No. 9,697,134, the specifications of which are incorporated herein by reference.

TECHNICAL FIELD

The present disclosure relates generally to semiconductor memory and methods, and more particularly, to memory having a static cache and a dynamic cache.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Memory cells in an array architecture can be programmed to a target (e.g., desired) state. For instance, electric charge can be placed on or removed from the charge storage structure (e.g., floating gate) of a memory cell to program the cell to a particular data state. The stored charge on the charge storage structure of the memory cell can indicate a threshold voltage (Vt) of the cell, and the state of the cell can be determined by sensing the stored charge (e.g., the Vt) of the cell.

For example, a single level cell (SLC) can be programmed to a targeted one of two different data states, which can be represented by the binary units 1 or 0. Some flash memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one bit).

In some instances, caching (e.g., caching schemes) can be utilized in memory (e.g., SSDs) to increase the performance (e.g., speed) and/or endurance (e.g., lifetime) of the memory. For example, a portion (e.g., a number of blocks) of a memory can be utilized as a cache to temporarily store data that may be used again in subsequent program (e.g., write) and/or sense (e.g., read) operations performed on the memory.

DETAILED DESCRIPTION

Figure 1:
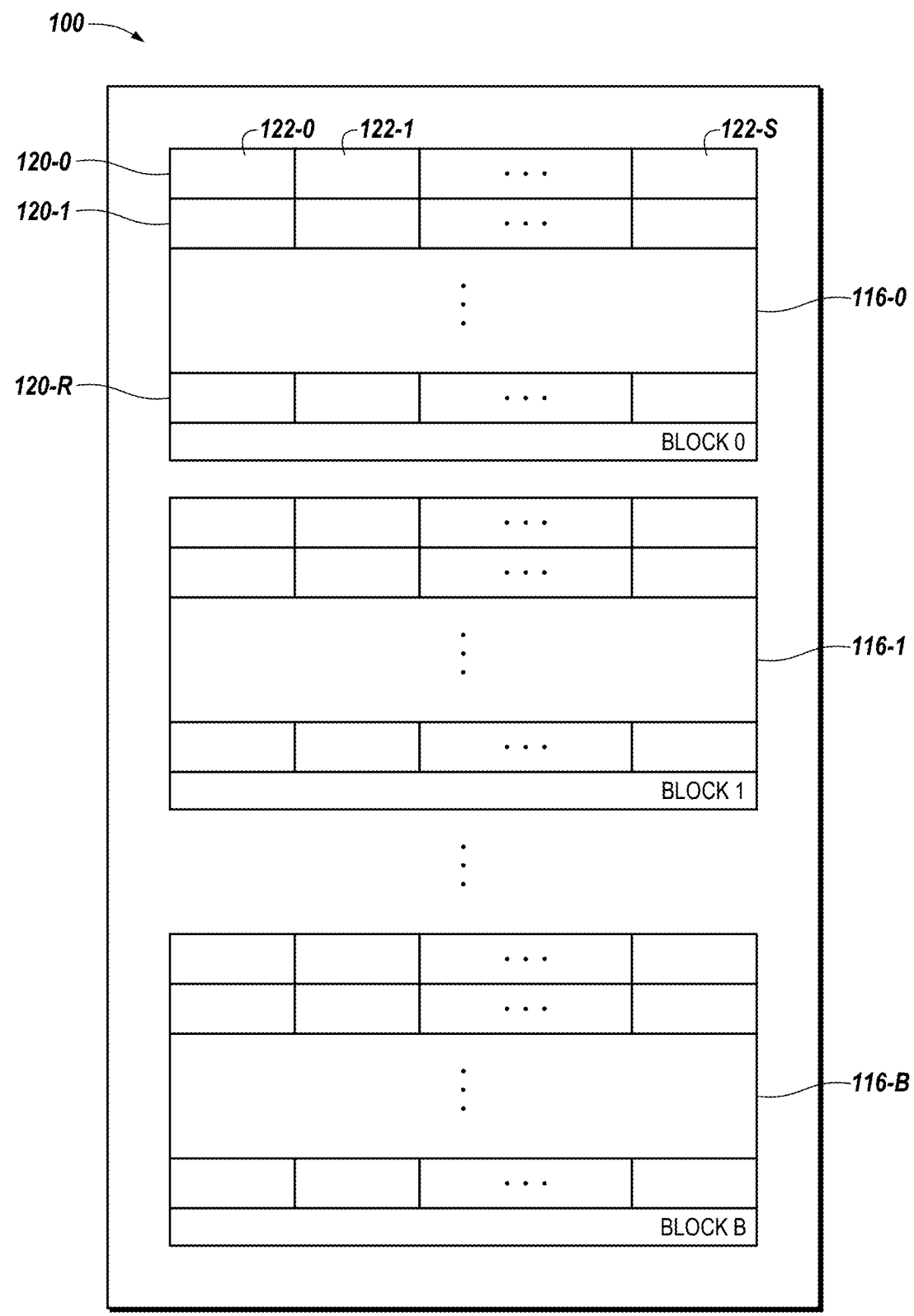
FIG. 1 illustrates a diagram of a portion of a memory array having a number of physical blocks in accordance with a number of embodiments of the present disclosure.

The present disclosure includes memory having a static cache and a dynamic cache. A number of embodiments include a memory, wherein the memory includes a first portion configured to operate as a static single level cell (SLC) cache and a second portion configured to operate as a dynamic SLC cache when the entire first portion of the memory has data stored therein.

Caching schemes (e.g., memory having a static cache and a dynamic cache) in accordance with the present disclosure can increase the performance (e.g., increase the speed, increase the reliability, and/or decrease the power consumption) and/or increase the endurance (e.g., increase the lifetime) of the memory, among other benefits. For example, caching schemes in accordance with the present disclosure can increase the performance of the memory early in (e.g., at the beginning of) the lifetime of the memory, when large program operations, such as operating system (OS) and/or program (e.g., game) installations, are likely to be performed on the memory. Further, caching schemes in accordance with the present disclosure can ensure that the endurance of the memory is protected during periods of heavy use of the memory (e.g., periods when a large number of program and/or erase operations are being performed on the memory).

Further, caching schemes in accordance with the present disclosure can increase the performance and/or endurance of the memory as compared with previous caching approaches. For example, a number of previous caching approaches may utilize only a single portion of the memory to operate as a static (e.g., dedicated) cache in SLC mode. However, when this entire portion of the memory has data stored therein (e.g., when the entire cache becomes full), the performance of the memory may sharply decrease. As an additional example, a number of previous caching approaches may utilize the entire memory to operate as dynamic cache in SLC mode. However, utilizing the entire memory in such a manner can result in stress on the memory cells due to, for example, the mixed mode utilization between various bits per cell configuration, which may reduce the endurance of the memory.

As used herein, "a number of" something can refer to one or more such things. For example, a number of memory cells can refer to one or more memory cells. Additionally, the designators "N", "B", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 210 may reference element "10" in FIG. 2, and a similar element may be referenced as 310 in FIG. 3.

FIG. 1 illustrates a diagram of a portion of a memory array 100 having a number of physical blocks in accordance with a number of embodiments of the present disclosure. Memory array 100 can be, for example, a NAND flash memory array. However, embodiments of the present disclosure are not limited to a particular type of memory or memory array. For example, memory array 100 can be a DRAM array, an RRAM array, or a PCRAM array, among other types of memory arrays. Further, although not shown in FIG. 1, memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), ..., 116-B (BLOCK B) of memory cells. The memory cells can be single level cells and/or multilevel cells such as, for instance, triple level cells (TLCs) or quadruple level cells (QLCs). As an example, the number of physical blocks in memory array 100 may be 128 blocks, 512 blocks, or 1,024 blocks, but embodiments are not limited to a particular multiple of 128 or to any particular number of physical blocks in memory array 100. A first number of blocks 116-0, 116-1, ..., 116-B can be configured to operate as a static SLC cache, and a second number of blocks 116-0, 116-1, ..., 116-B can be configured to operate as a dynamic SLC cache, as will be further described herein.

A number of physical blocks of memory cells (e.g., blocks 116-0, 116-1, ..., 116-B) can be included in a plane of memory cells, and a number of planes of memory cells can be included on a die. For instance, in the example shown in FIG. 1, each physical block 116-0, 116-1, ..., 116-B can be part of a single die. That is, the portion of memory array 100 illustrated in FIG. 1 can be die of memory cells.

As shown in FIG. 1, each physical block 116-0, 116-1, ..., 116-B contains a number of physical rows (e.g., 120-0, 120-1, ..., 120-R) of memory cells coupled to access lines (e.g., word lines). The number of rows (e.g., word lines) in each physical block can be 32, but embodiments are not limited to a particular number of rows 120-0, 120-1, ..., 120-R per physical block. Further, although not shown in FIG. 1, the memory cells can be coupled to sense lines (e.g., data lines and/or digit lines).

As one of ordinary skill in the art will appreciate, each row 120-0, 120-1, ..., 120-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 120-0, 120-1, ..., 120-R comprises one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

A program operation (e.g., a write operation) can include applying a number of program pulses (e.g., 16V-20V) to a selected word line in order to increase the threshold voltage (Vt) of the selected cells coupled to that selected word line to a desired program voltage level corresponding to a target (e.g., desired) data state. A sense operation, such as a read or program verify operation, can include sensing a voltage and/or current change of a sense line coupled to a selected cell in order to determine the data state of the selected cell.

In a number of embodiments of the present disclosure, and as shown in FIG. 1, a page of memory cells can comprise a number of physical sectors 122-0, 122-1, ..., 122-S (e.g., subsets of memory cells). Each physical sector 122-0, 122-1, ..., 122-S of cells can store a number of logical sectors of data (e.g., data words). Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 122-0, 122-1, ... 122-S, can store system and/or user data, and/or can include overhead data, such as error correction code (ECC) data, logical block address (LBA) data, and recurring error data.

Logical block addressing is a scheme that can be used by a host for identifying a logical sector of data. For example, each logical sector can correspond to a unique logical block address (LBA). Additionally, an LBA may also correspond to a physical address. A logical sector of data can be a number of bytes of data (e.g., 256 bytes, 512 bytes, or 1,024 bytes). However, embodiments are not limited to these examples.

It is noted that other configurations for the physical blocks 116-0, 116-1, ..., 116-B, rows 120-0, 120-1, ..., 120-R, sectors 122-0, 122-1, ..., 122-S, and pages are possible. For example, rows 120-0, 120-1, ..., 120-R of physical blocks 116-0, 116-1, ..., 116-B can each store data corresponding to a single logical sector which can include, for example, more or less than 512 bytes of data.

Figure 2:
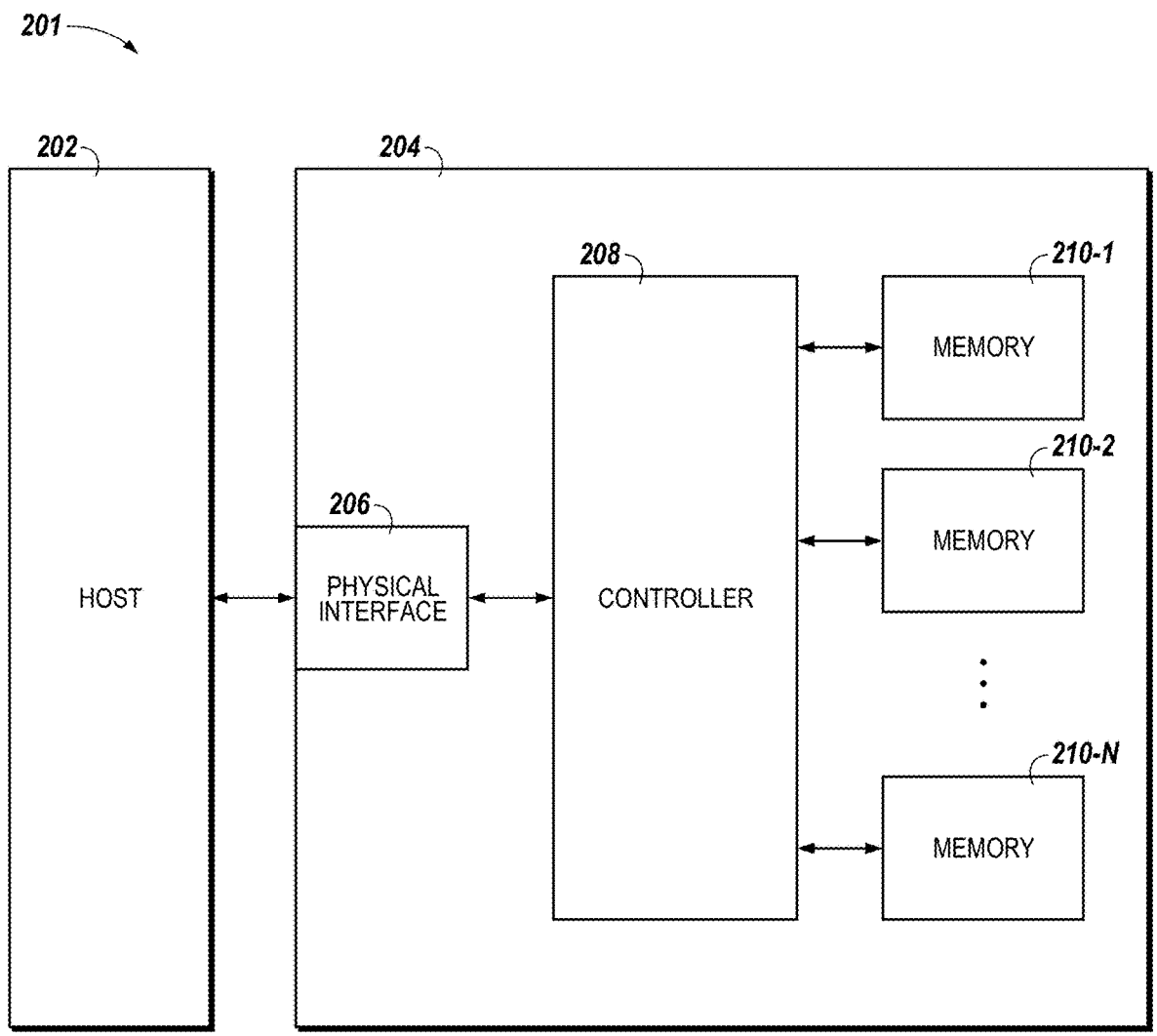
FIG. 2 is a functional block diagram of a computing system including an apparatus in the form of a memory device in accordance with a number of embodiments of the present disclosure.

FIG. 2 is a functional block diagram of a computing system 201 including an apparatus in the form of a memory device 204 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

Memory device 204 can be, for example, a solid state drive (SSD). In the embodiment illustrated in FIG. 2, memory device 204 includes a physical host interface 206, a number of memories 210-1, 210-2, ... 210-N (e.g., solid state memory devices), and a controller 208 (e.g., an SSD controller) coupled to physical host interface 206 and memories 210-1, 210-2, . . . , 210-N.

Memories 210-1, 210-2, . . . , 210-N can include, for example, a number of non-volatile memory arrays (e.g., arrays of non-volatile memory cells). For instance, memories 210-1, 210-2, . . . , 210-N can include a number of memory arrays analogous to memory array 100 previously described in connection with FIG. 1.

Physical host interface 206 can be used to communicate information between memory device 204 and another device such as a host 202. Host 202 can include a memory access device (e.g., a processor). One of ordinary skill in the art will appreciate that "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

Physical host interface 206 can be in the form of a standardized physical interface. For example, when memory device 204 is used for information storage in computing system 201, physical host interface 206 can be a serial advanced technology attachment (SATA) physical interface, a peripheral component interconnect express (PCIe) physical interface, or a universal serial bus (USB) physical interface, among other physical connectors and/or interfaces. In general, however, physical host interface 206 can provide an interface for passing control, address, information (e.g., data), and other signals between memory device 204 and a host (e.g., host 202) having compatible receptors for physical host interface 206.

Controller 208 can include, for example, control circuitry and/or logic (e.g., hardware and firmware). Controller 208 can be included on the same physical device (e.g., the same die) as memories 210-1, 210-2, . . . , 210-N. For example, controller 208 can be an application specific integrated circuit (ASIC) coupled to a printed circuit board including physical host interface 206 and memories 210-1, 210-2, . . . , 210-N. Alternatively, controller 208 can be included on a separate physical device that is communicatively coupled to the physical device that includes memories 210-1, 210-2, . . . , 210-N. In a number of embodiments, components of controller 208 can be spread across multiple physical devices (e.g., some components on the same die as the memory, and some components on a different die, module, or board) as a distributed controller.

Controller 208 can communicate with memories 210-1, 210-2, . . . , 210-N to sense (e.g., read), program (e.g., write), and/or erase information, among other operations. Controller 208 can have circuitry that may be a number of integrated circuits and/or discrete components. In a number of embodiments, the circuitry in controller 208 may include control circuitry for controlling access across memories 210-1, 210-2, . . . , 210-N and/or circuitry for providing a translation layer between host 202 and memory device 204.

Controller 208 can operate a dedicated region, such as a block addressing portion, of each respective memory 210-1, 210-2, . . . , 210-N as (e.g., configure a portion of each respective memory 210-1, 210-2, . . . , 210-N to operate as) a static (e.g., dedicated) single level cell (SLC) cache. That is, this portion of each respective memory can be configured to operate as a static cache in SLC mode. This portion of each respective memory 210-1, 210-2, . . . , 210-N can be, for example, a first plurality of blocks (e.g., physical blocks) of memory cells in each respective memory, as will be further described herein (e.g., in connection with FIG. 3), and may be referred to herein as a first portion of the memory.

To ensure the highest possible endurance is available for the static SLC cache, the dedicated region (e.g., first portion) of each respective memory can be configured to continuously operate in SLC mode as the static SLC cache for the entire lifetime of memory device 204, as SLC erase operations (e.g., erase operations performed in SLC mode) are orders of magnitude less destructive than MLC (e.g., TLC) erase operations. For example, in a number of embodiments, the memory cells of the first portion (e.g., the memory cells of the first plurality of blocks) can be MLCs configured to operate in SLC mode, and in a number of embodiments, the memory cells of the first portion can be SLCs. In both such embodiments, controller 208 can perform erase operations, as well as program and sense operations, on the cells in SLC mode.

Controller 208 can operate a second portion of each respective memory 210-1, 210-2, . . . , 210-N as (e.g., configure a second portion of each respective memory 210-1, 210-2, . . . , 210-N to operate as) a dynamic SLC cache when the entire first portion of each respective memory has data stored therein (e.g., when the first portion is full and/or when host 202 is attempting to program more data than may be stored in the first portion), and can operate the second portion of each respective memory as (e.g., configure the second portion of each respective memory to operate as) MLC memory (e.g., in MLC storage mode) when less than the entire first portion of each respective memory has data stored therein (e.g., when the first portion is not full). That is, the second portion can be configured to operate as an overflow cache in SLC mode when the entire first portion (e.g., the entire static SLC cache) has data stored therein, and operate as standard MLC memory (e.g., store data in MLC mode) when less than the entire first portion (e.g., less than the entire static SLC cache) has data stored therein. For instance, the second portion can operate as TLC or QLC memory when less than the entire first portion has data stored therein.

As used herein, MLC memory (e.g., MLCs) can refer to memory (e.g. memory cells) that can be programmed to a targeted one of more than two data states (e.g., memory cells that can store two or more bits of data). For example, MLC memory can refer to memory cells that store two bits of data per cell, memory cells that store three bits of data per cell (e.g., TLCs), and/or memory cells that store four bits of data per cell (e.g., QLCs).

Figure 3:
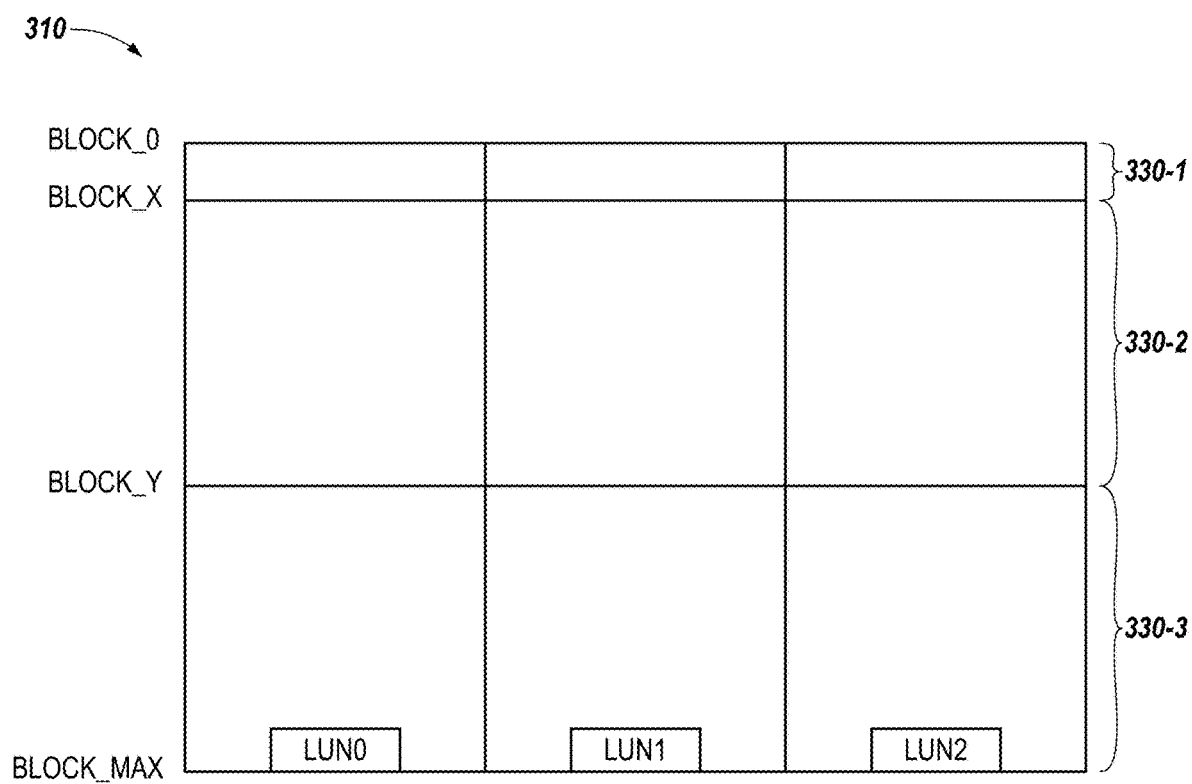
FIG. 3 illustrates a diagram of a memory having a static cache and a dynamic cache in accordance with a number of embodiments of the present disclosure.

The second portion of each respective memory 210-1, 210-2, . . . , 210-N can be, for example, a second plurality of blocks (e.g., physical blocks) of memory cells in each respective memory, as will be further described herein (e.g., in connection with FIG. 3). Controller 208 can perform erase operations, as well as program and sense operations, on the cells of the second portion in MLC mode.

The size of the second portion of each respective memory 210-1, 210-2, . . . , 210-N can correspond to the quantity of memory cells used by that memory to program data stored in the SLCs of the memory to the MLCs of the memory (e.g., to fold the SLC data to the MLCs). For example, the size of the second portion can be the total size of the memory in target density, minus the size of the first portion multiplied by the number of bits per cell in the second portion (e.g., 3 if the second portion is configured to operate as TLC, 4 if the second portion is configured to operate as QLC). Generally, the size of the first portion is small as compared to the whole drive density. For example, for a memory whose total size (e.g., drive density) is 128 GB, the size of the first portion may be 3 GB, and the size of the second portion would be the balance (e.g., 128 GB-3 GB*x, where x is the number of bits per cell in the second portion).

In a number of embodiments, the second portion of each respective memory may only operate as a dynamic SLC cache (e.g., as an overflow cache in SLC mode) until up to a particular point in the lifetime of memory device 204. Upon that point being reached, controller 208 can operate the second portion as MLC memory (e.g., in MLC storage mode). That is, upon the particular point in the lifetime of memory device 204 being reached, controller 208 can disable (e.g., turn off) the overflow cache functionality of the second portion.

For example, controller 208 can operate the second portion of the memory as MLC memory upon the quantity of program operations performed on the second portion meeting or exceeding a particular threshold (e.g., a particular quantity of program operations), upon the quantity of erase operations performed on the second portion meeting or exceeding a particular threshold (e.g., a particular quantity of erase operations), and/or upon the quantity of blocks in the second portion having data stored therein meeting or exceeding a particular threshold (e.g., a particular quantity of blocks). As an additional example, controller 208 can operate the second portion of the memory as MLC memory upon the quantity of blocks used by the memory to program data stored in the SLCs of the memory to the MLCs of the memory being equal to or greater than the quantity of blocks in the second portion.

The embodiment illustrated in FIG. 2 can include additional circuitry, logic, and/or components not illustrated so as not to obscure embodiments of the present disclosure. For example, memory device 204 can include address circuitry to latch address signals provided over I/O connectors through I/O circuitry. Address signals can be received and decoded by a row decoders and column decoders, to access memories 210-1, 210-2, . . . , 210-N.

FIG. 3 illustrates a diagram of a memory 310 having a static cache and a dynamic cache in accordance with a number of embodiments of the present disclosure. Memory 310 can be analogous to memories 210-1, 210-2, . . . , 210-N previously described in connection with FIG. 2. For example, memory 310 can include a number of memory arrays analogous to memory array 100 previously described in connection with FIG. 1.

As shown in FIG. 3, memory 310 can include a first portion 330-1, a second portion 330-2, and a third portion 330-3. Each respective portion 330-1, 330-2, 330-3 can include a number of blocks (e.g., physical blocks) of memory cells (e.g., portion 330-1 can include a first number of blocks, portion 330-2 can include a second number of blocks, and portion 330-3 can include a third number of blocks). For instance, in the example illustrated in FIG. 3, portion 330-1 can include Block_0 through Block_x−1 of memory 310, portion 330-2 can include Block_x through Block_y−1 of memory 310, and portion 330-3 can include Block_y through Block_Max of memory 310.

As shown in FIG. 3, portion 330-1 can be smaller (e.g., include fewer blocks of memory cells) than portions 330-2 and 330-3. For example, portion 330-1 may include 2-3% of the total number of blocks in memory 310. However, embodiments of the present disclosure are not limited to a particular size for (e.g., number of blocks in) portions 330-1, 330-2, and 330-3. Further, although portions 330-1, 330-2, and 330-3 are illustrated as contiguous areas (e.g., as comprising contiguous blocks of memory cells) in FIG. 3, embodiments of the present disclosure are not so limited (e.g., portions 330-1, 330-2, and/or 330-3 may comprise non-contiguous blocks of memory cells).

As shown in FIG. 3, a different logical unit number (LUN) can be associated with different sub-portions of portions 330-1, 330-2, and 330-3. For instance, in the example illustrated in FIG. 3, LUN0 can be associated with a first sub-portion of portions 330-1, 330-2, and 330-3, LUN1 can be associated with a second sub-portion of portions 330-1, 330-2, and 330-3, and LUN2 can be associated with a third sub-portion of portions 330-1, 330-2, and 330-3. Embodiments of the present disclosure, however, are not limited to this example.

The blocks of portion 330-1 can be configured to operate as a static (e.g., dedicated) single level cell (SLC) cache. That is, the blocks of portion 330-1 can be configured to operate as a static cache in SLC mode. For example, the blocks of portion 330-1 can be configured to continuously operate in SLC mode as a static SLC cache for the entire lifetime of memory 310, in a manner analogous to that described in connection with FIG. 2.

The blocks of portion 330-2 can be configured to operate as a dynamic SLC cache when all of the blocks of portion 330-1 have data stored therein (e.g., when there are no free blocks in portion 330-1), and can be configured to operate as MLC memory (e.g., in MLC storage mode) when less than all of the blocks of portion 330-1 have data stored therein (e.g., when there are free blocks in portion 330-1). That is, the blocks of portion 330-2 can be configured to operate as an overflow cache in SLC mode when all the blocks of portion 330-1 have data stored therein, and to operate as standard MLC memory (e.g., store data in MLC mode) when less than all of the blocks of portion 330-1 have data stored therein. In a number of embodiments, the blocks of portion 330-2 may only operate as a dynamic SLC cache (e.g., as an overflow cache in SLC mode) until up to a particular point in the lifetime of memory 310, in a manner analogous to that previously described in connection with FIG. 2.

The blocks of portion 330-3 can be configured to continuously operate as MLC memory (e.g., in MLC storage mode) for the entire lifetime of memory 310. That is, the blocks of portion 330-3 may not be part of (e.g., used for) the static SLC cache or the dynamic SLC cache during operation of memory 310.

Figure 4:
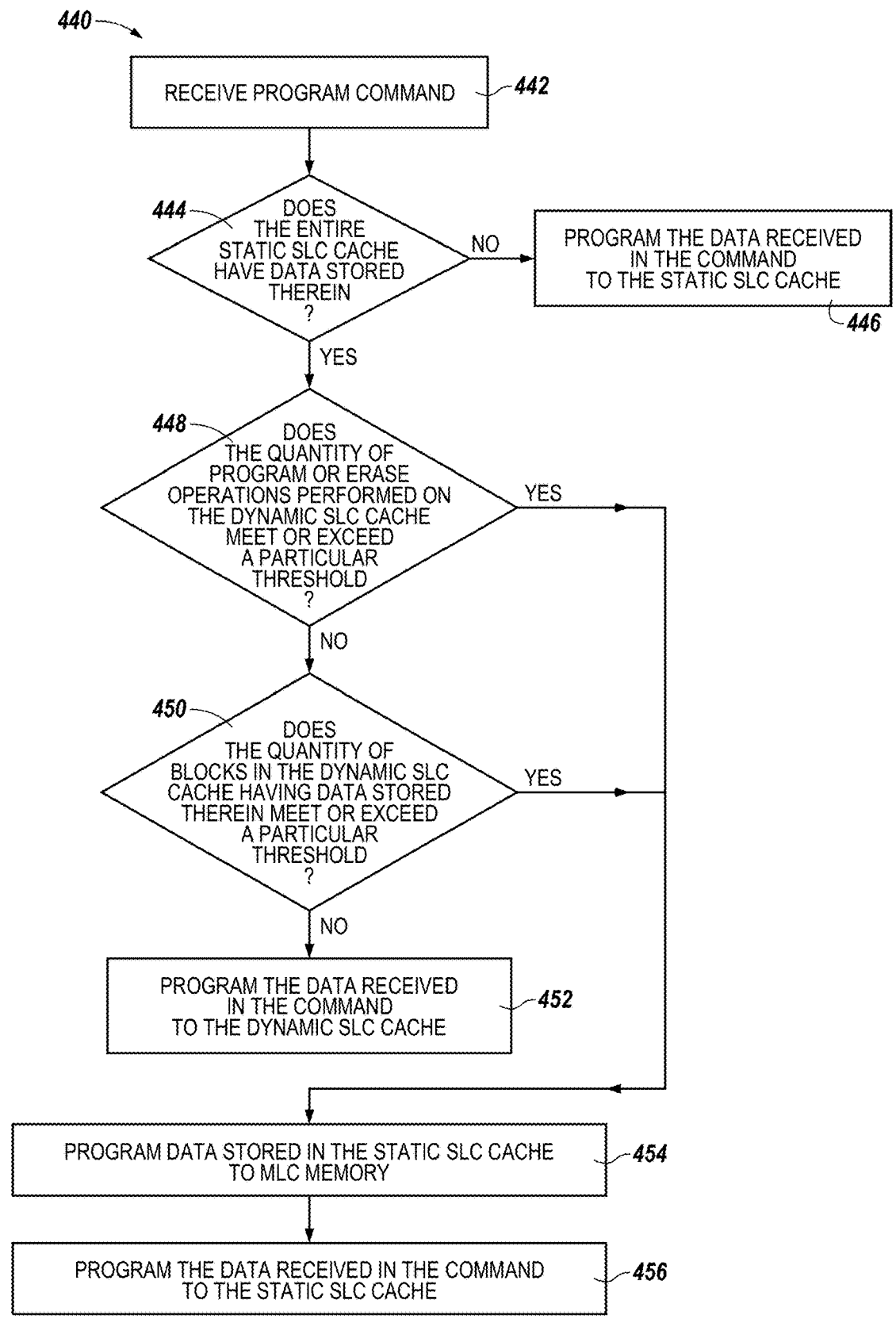
FIG. 4 illustrates a method of operating memory in accordance with a number of embodiments of the present disclosure.

FIG. 4 illustrates a method 440 of operating memory in accordance with a number of embodiments of the present disclosure. Method 440 can be performed by, for example, controller 208 previously described in connection with FIG. 2.

The memory can be, for example, memories 210-1, 210-2, . . . 210-N previously described in connection with FIG. 2 and/or memory 310 previously described in connection with FIG. 3. That is, the memory can include a first portion (e.g., a first number of blocks) configured to operate as a static SLC cache, a second portion (e.g., a second number of blocks) configured to operate as a dynamic SLC cache when the entire first portion has data stored therein and configured to operate as MLC memory (e.g., in MLC storage mode) when less than the entire first portion has data stored therein, and a third portion (e.g., a third number of blocks) configured to operate as MLC memory, as previously described herein.

At block 442, method 440 includes receiving a command to program (e.g., write) data to the memory. The command can be received from, for example, host 202 previously described in connection with FIG. 2.

At block 444, method 440 includes determining whether the entire first portion of the memory (e.g., the entire static SLC cache) has data stored therein. Determining whether the entire static SLC cache has data stored therein can include, for example, determining whether there are any blocks in the static SLC cache that do not have data stored therein. For instance, determining whether the entire static SLC cache has data stored therein can include determining whether there are any blocks in the static SLC cache that are erased (e.g., free) blocks. The determination of whether the entire static SLC cache has data stored therein can be made using, for example, a tracking table in the host or the controller.

If it is determined that the entire static SLC cache does not have data stored therein (e.g., that there are blocks in the static SLC cache that do not have data stored therein), then the data received in the program command is programmed to (e.g., cached in) the static SLC cache at block 446. For instance, the data may be programmed to the block(s) in the static SLC cache that do not have data stored therein (e.g., to the free block(s) in the static SLC cache).

If it is determined that the entire static SLC cache has data stored therein (e.g., that there are no blocks in the static SLC cache that do not have data stored therein), it can then be determined whether the quantity of program or erase operations that have been performed on the second portion of the memory (e.g., on the dynamic SLC cache) meets or exceeds a particular threshold (e.g., a particular quantity) at block 448. For instance, the controller can track (e.g., count) the quantity of program or erase operations performed on the dynamic SLC cache, and the tracked quantity can be compared to the threshold to determine whether the threshold has been met or exceeded.

If it is determined that the quantity of program or erase operations performed on the dynamic SLC cache meets or exceeds the particular threshold, then data stored in the static SLC cache (e.g., in a block of the static SLC cache) can be programmed (e.g., folded) to MLC memory at block 454. For example, data stored in the static SLC cache can be programmed to the MLC memory of the third portion of the memory. As an additional example, the dynamic SLC cache can be configured to operate as MLC memory (e.g., the second portion of the memory can be converted from the dynamic SLC cache to MLC memory), to which the data stored in the static SLC cache can then be programmed.

The data received in the program command is then programmed to (e.g., cached in) the static SLC cache at block 456. For instance, the data may be programmed to the block of the static SLC cache in which the data folded to the MLC memory was stored.

If it is determined that the quantity of program or erase operations performed on the dynamic SLC cache does not meet or exceed the particular threshold, it can then be determined whether the quantity of blocks in the dynamic SLC cache having data stored therein meets or exceeds a particular threshold (e.g., a particular quantity of blocks) at block 450. This determination can be made using, for example, a tracking table in the host or the controller.

If it is determined that the quantity of blocks in the dynamic SLC cache having data stored therein meets or exceeds the particular threshold, method 440 can proceed to blocks 454 and 456, which have been previously described herein. If it is determined that the quantity of blocks in the dynamic SLC cache having data stored therein does not meet or exceed the particular threshold, the data received in the program command can then be programmed to (e.g., cached in) the dynamic SLC cache at block 452.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory having a first portion and a second portion; and
    circuitry configured to:
        operate the first portion of the memory as a static cache;
        operate the second portion of the memory as a dynamic cache; and
        adjust a size of the dynamic cache based on an amount of data stored in the memory by operating the dynamic cache as a single level cell cache or multilevel cell memory based on whether the entire first portion of the memory has data stored therein.

2. The apparatus of claim 1, wherein adjusting the size of the dynamic cache includes operating all of the dynamic cache as the single level cell cache.

3. The apparatus of claim 1, wherein adjusting the size of the dynamic cache includes operating none of the dynamic cache as the single level cell cache.

4. The apparatus of claim 3, wherein operating none of the dynamic cache as the single level cell cache includes operating the dynamic cache as the as multilevel cell memory.

5. The apparatus of claim 1, wherein:
    the static cache is a static single level cell (SLC) cache.

6. A method of operating memory, comprising:
    operating a first portion of a memory as a static cache;
    operating a second portion of the memory as a dynamic cache; and
    adjusting a size of the dynamic cache based on an amount of data stored in the memory by:
        operating the dynamic cache as a single level cell cache when the entire first portion of the memory has data stored therein; and
        operating the dynamic cache as multilevel cell memory when less than the entire first portion of the memory has data stored therein.

7. The method of claim 6, wherein adjusting the size of the dynamic cache includes:
   operating all of the dynamic cache as the single level cell cache when the entire first portion of the memory has data stored therein; and
   operating none of the dynamic cache as the single level cell cache when less than the entire first portion of the memory has data stored therein.

8. The method of claim 6, wherein the method includes operating the first portion of the memory as the static cache for an entire lifetime of the memory.

9. The method of claim 6, wherein the method includes operating a third portion of the memory as multilevel cell memory.

10. The method of claim 6, wherein the method includes:
    receiving a command to program data to the memory; and
    programming the data received in the command to the static cache or to the dynamic cache.

11. The method of claim 10, wherein the method includes determining which one of the static cache or the dynamic cache to program the data received in the command to based on whether the entire first portion of the memory has data stored therein.

12. An apparatus, comprising:
    a memory having a first portion, a second portion, and a third portion; and
    circuitry configured to:
        operate the first portion of the memory as a static cache;
        operate the second portion of the memory as a dynamic cache;
        operate the third portion of the memory as multilevel cell (MLC) memory; and
        adjust a size of the dynamic cache based on an amount of data stored in the memory by operating the dynamic cache as a single level cell (SLC) cache or MLC memory based on whether the entire first portion of the memory has data stored therein.

13. The apparatus of claim 12, wherein the memory includes dynamic random access memory (DRAM).

14. The apparatus of claim 12, wherein the MLC memory of the third portion of the memory comprises quadruple level memory.

15. The apparatus of claim 12, wherein the circuitry is configured to:
    receive a command to program data to the memory; and
    program the data received in the command to the static cache, the dynamic cache, or the MLC memory of the third portion of the memory.

16. The apparatus of claim 15, wherein the circuity is configured to determine which one of the static cache, the dynamic cache, or the MLC memory to program the data received in the command to based on whether the entire first portion of the memory has data stored therein.

17. The apparatus of claim 12, wherein the first portion of the memory is smaller than the second portion of the memory.

18. The apparatus of claim 12, wherein the first portion of the memory, the second portion of the memory, and the third portion of the memory each include a number of physical blocks of memory cells.

* * * * *